UNITED STATES PATENT OFFICE.

HENRY NOEL POTTER, OF NEW ROCHELLE, NEW YORK, ASSIGNOR TO GEO. WESTINGHOUSE, OF PITTSBURG, PENNSYLVANIA.

METHOD OF MAKING PAINT.

No. 830,740.  Specification of Letters Patent.  Patented Sept. 11, 1906.

Application filed June 10, 1905. Serial No. 264,551.

*To all whom it may concern:*

Be it known that I, HENRY NOEL POTTER, a citizen of the United States, and a resident of New Rochelle, county of Westchester, State of New York, have invented certain new and useful Improvements in Methods of Making Paint, of which the following is a specification.

I have discovered an improved method of making paint containing silicon monoxid, whereby the peculiar properties of the latter are certain to exert their maximum influence. I find that if silicon-monoxid powder be mixed dry with another pigment and the two ground together and then added to oil or other vehicle the effect of the silicon monoxid (SiO) is lost or masked. The fine particles of silicon monoxid (SiO) appear to stick to the relatively larger particles of the other pigment, and thus lose their identity as separate particles. The same to a lesser degree is true if dry SiO be added to a paint containing another pigment or if a dry pigment be added to a silicon-monoxid (SiO) paint. The best effect is secured by mixing SiO to the extent of ten per cent. to twenty per cent., say, with oil or vehicle and adding this to a paint of other pigment and vehicle properly prepared by grinding, &c., before the silicon-monoxid (SiO) paint is added. After adding the latter the two may be paddled together or ground, though the latter is no advantage over the former if the paint to which the silicon-monoxid (SiO) paint is added has been properly prepared.

I claim as my invention—

The method of preparing mixed paints containing silicon monoxid which consists in making a silicon-monoxid paint and a paint of other pigment and then combining these paints.

Signed at New York, in the county of New York and State of New York, this 7th day of June, A. D. 1905.

HENRY NOEL POTTER.

Witnesses:
WM. H. CAPEL,
GEORGE H. STOCKBRIDGE.